US011851131B2

(12) United States Patent
Li

(10) Patent No.: US 11,851,131 B2
(45) Date of Patent: Dec. 26, 2023

(54) VEHICLE STEERING STRUCTURE AND ALL-TERRAIN VEHICLE

(71) Applicant: SEGWAY TECHNOLOGY CO., LTD., Suzhou (CN)

(72) Inventor: Xiang Li, Suzhou (CN)

(73) Assignee: Segway Technology Co., Ltd., Jiangsu (CN)

( * ) Notice: Subject to any disclaimer, the term of this patent is extended or adjusted under 35 U.S.C. 154(b) by 258 days.

(21) Appl. No.: 17/381,325

(22) Filed: Jul. 21, 2021

(65) Prior Publication Data
US 2022/0024535 A1 Jan. 27, 2022

(30) Foreign Application Priority Data

Jul. 24, 2020 (CN) .......................... 202021486200.X

(51) Int. Cl.
*B62K 5/08* (2006.01)
*B62K 5/01* (2013.01)
*B62K 5/00* (2013.01)

(52) U.S. Cl.
CPC .................. *B62K 5/08* (2013.01); *B62K 5/01* (2013.01); *B62K 2005/001* (2013.01)

(58) Field of Classification Search
CPC ...... B62K 5/08; B62K 5/01; B62K 2005/001; B62D 1/16
See application file for complete search history.

(56) References Cited

U.S. PATENT DOCUMENTS

| 5,054,798 | A | * | 10/1991 | Zulawski | ................ | B62B 13/08 |
| | | | | | | 280/21.1 |
| 7,182,169 | B2 | | 2/2007 | Suzuki | | |
| 7,665,571 | B2 | * | 2/2010 | Kobayashi | ........... | B62D 5/0409 |
| | | | | | | 180/444 |
| 7,967,102 | B2 | * | 6/2011 | Okada | ....................... | B62K 5/01 |
| | | | | | | 180/443 |
| 7,992,671 | B2 | * | 8/2011 | Okada | ..................... | B60R 16/04 |
| | | | | | | 180/444 |
| 10,793,181 | B2 | * | 10/2020 | Bennett | .................. | B62D 39/00 |

(Continued)

FOREIGN PATENT DOCUMENTS

CN 208165085 U 11/2018
DE 2652906 A1 5/1978

(Continued)

OTHER PUBLICATIONS

European Patent Office, Search Report for EP application 21186735.3, dated Dec. 14, 2021.

*Primary Examiner* — Tony H Winner
*Assistant Examiner* — Marlon A Arce
(74) *Attorney, Agent, or Firm* — Timothy W. Menasco, Esq.; Harter Secrest & Emery LLP

(57) ABSTRACT

A vehicle steering structure includes a steering column, a bearing, a frame and a wheel steering assembly. The bearing includes an outer ring with an inner spherical surface and an inner ring with an outer spherical surface, the inner ring is arranged in the outer ring, and an outer circumference of the outer ring is connected to the frame. The steering column passes through the inner ring, and has a first end connected to the steering control part and a second end connected to the wheel steering assembly. The vehicle steering structure may be applied in an all-terrain vehicle.

19 Claims, 6 Drawing Sheets

(56) References Cited

U.S. PATENT DOCUMENTS

2006/0169525 A1    8/2006    Saito et al.
2006/0180385 A1*    8/2006    Yanai ........................ B62D 5/04
                                                                                                             180/444

FOREIGN PATENT DOCUMENTS

EP            2008914 A2    12/2008
JP           2002037117 A    2/2002

* cited by examiner

VEHICLE STEERING STRUCTURE AND ALL-TERRAIN VEHICLE

CROSS-REFERENCE TO RELATED APPLICATION

This application claims priority to and benefits of Chinese Patent Application Serial No. 202021486200.X, filed with China National Intellectual Property Administration on Jul. 24, 2020, the entire content of which is incorporated herein by reference.

FIELD

Embodiments of the present disclosure relates to the field of vehicle equipment manufacturing technologies, and more particularly, to a vehicle steering structure and an all-terrain vehicle.

BACKGROUND

At present, a steering assembly of general vehicles usually employs a form in which a steering column passes through an inner ring of a spherical bearing and then is connected to a non-power steering device. However, due to manufacturing error and assembly error, this structure easily causes that upper and lower parts of the steering column are not coaxial, and the steering of the vehicle is heavy, thus affecting the driving experience. Moreover, if using in long-term, it will cause certain wear to the parts for fixing the steering column, thus affecting the driving safety.

In short, the vehicle steering structure at present has technical problems of heavy steering and easy to wear.

SUMMARY

In a first aspect, embodiments of the present disclosure provide a vehicle steering structure, which includes a steering column, a bearing, a frame, and a wheel steering assembly. The bearing includes an outer ring with an inner spherical surface and an inner ring with an outer spherical surface, the inner ring is arranged in the outer ring, and an outer circumference of the outer ring is connected to the frame. The steering column passes through the inner ring, and has a first end configured to connect a steering control part and a second end connected to the wheel steering assembly.

In a second aspect, embodiments of the present disclosure provide an all-terrain vehicle, which includes a steering control part and a vehicle steering structure. The vehicle steering structure includes a steering column, a bearing, a frame, and a wheel steering assembly. The bearing includes an outer ring with an inner spherical surface and an inner ring with an outer spherical surface, the inner ring is arranged in the outer ring, and an outer circumference of the outer ring is connected to the frame. The steering column passes through the inner ring, and has a first end configured to connect a steering control part and a second end connected to the wheel steering assembly.

BRIEF DESCRIPTION OF THE DRAWINGS

To describe technical solutions in embodiments of the present disclosure or in the related art more clearly, the following will briefly introduce the accompanying drawings required for the description of the embodiments or the related art. Obviously, the accompanying drawings described below show some embodiments of the present disclosure, and those skilled in the art can obtain other drawings based on these drawings without paying creative efforts.

DETAILED DESCRIPTION

The following will explain embodiments of the present disclosure in detail in combination with the accompanying drawings and embodiments, herewith to fully understand and implement the realization process of how the present disclosure solves technical problems by using the technical means and achieve technical effects.

For example, some words are used in the specification and claims to refer to specific assemblies. It could be understood by those skilled in the art that hardware manufacturers may use different terms to address the same assembly. The specification and claims do not use name differences as the way to distinguish assemblies, but use the functional differences of assemblies as the criteria for distinguishing assemblies. The "including" mentioned in the entire specification and claims is an open term, so it should be interpreted as "including but not limited to". "Substantially" means that within acceptable error range, those skilled in the art can solve the technical problem within a certain error range, and the technical effect can be substantially achieved. In addition, the term "coupled" or "electrically coupled" here includes any direct and indirect electrical coupling means. Therefore, if the text describes that a first device is coupled to a second device, it means that the first device can be electrically coupled to the second device directly, or electrically coupled to the second device indirectly through other devices or coupling means. The following description of the specification is preferred embodiments for implementing the present disclosure, but the description is for the purpose of explaining general principles of the present disclosure, and is not intended to limit the scope of the present disclosure. The protection scope of the present disclosure shall be subject to those defined by the appended claims.

It shall also be noted that the terms "includes", "comprises" or any other variation is intended to cover non-exclusive inclusion, so that processes, methods, goods or systems that include a series of elements include not only those elements, but also other elements not explicitly listed, or also include inherent elements for such processes, methods, goods or systems. Without more restrictions, elements defined by the statement "includes a . . ." do not exclude the existence of other identical elements in the process, method, commodity or system including the elements.

Figure 1:
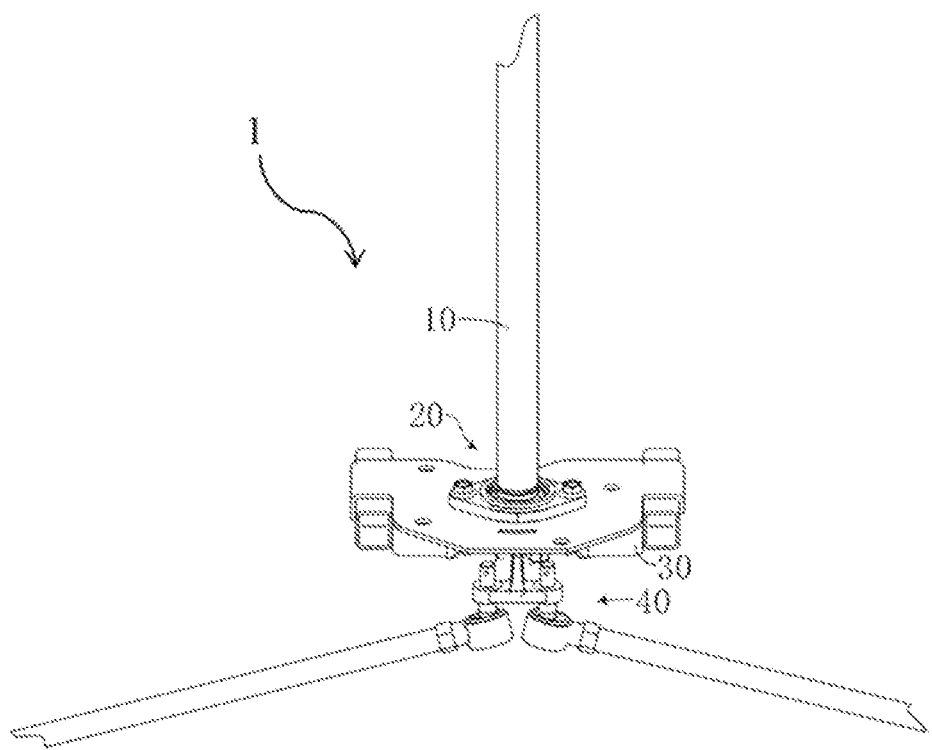
FIG. 1 is a schematic perspective view of a vehicle steering structure provided by an embodiment of the present disclosure.

Referring to FIG. 1, which is a schematic perspective view of a vehicle steering structure 1 provided by embodiments of the present disclosure. The vehicle steering structure 1 includes a steering column 10, a bearing 20, a frame 30 and a wheel steering assembly 40.

Figure 2A:
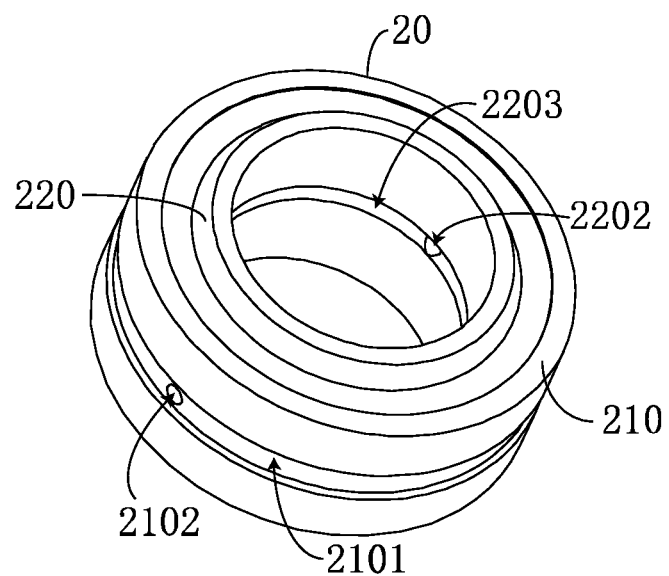
FIG. 2a is a schematic perspective view of a centripetal joint bearing of a vehicle steering structure provided by an embodiment of the present disclosure.
Figure 2B:
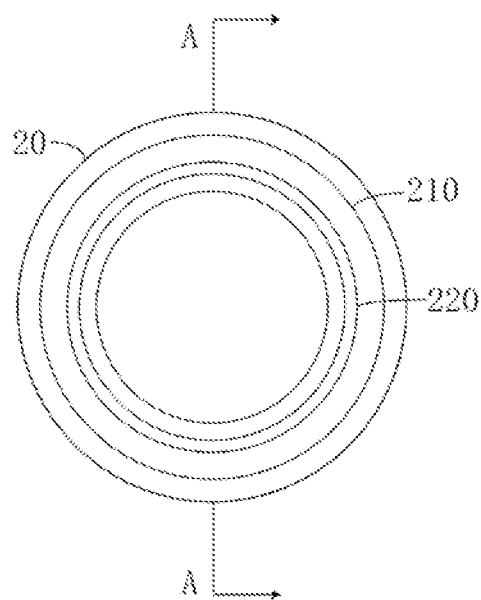
FIG. 2b is a schematic side view of a centripetal joint bearing of a vehicle steering structure provided by an embodiment of the present disclosure.
Figure 2C:
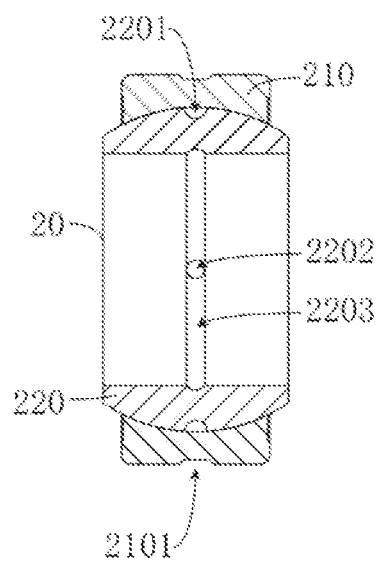
FIG. 2c is a cross-sectional view taken along A-A of FIG. 2b.

In combination with FIGS. 2*a*, 2*b*, and 2*c*, the bearing 20 includes an outer ring 210 with an inner spherical surface and an inner ring 220 with an outer spherical surface, the inner ring 220 is arranged in the outer ring 210, and an outer circumference of the outer ring 210 is connected to the frame 30. The steering column 10 passes through the inner ring 220, an end of the steering column 10 is connected to a steering control part, and the other end is connected to the wheel steering assembly 40.

In at least one embodiment, the inner ring 220 is located in the outer ring 210, an inner wall of the outer ring 210 is the inner spherical surface, an outer wall of the inner ring 220 is the outer spherical surface, and the inner spherical surface and the outer spherical surface are in contact with each other. Both can swing and rotate at any angle during the movement. The bearing 20 is made by various special processing methods such as alramenting, opening, inlaying and spraying. The outer wall of the outer ring 210 is fixedly connected to the frame 30. The steering column 10 can be a hollow column or prism structure, or a solid column or prism structure. The steering column 10 passes through the inner ring 220, the steering column 10 passes through the inner ring 220 and can be connected by providing a connection structure, and for example, a groove can be defined in the inner ring 220, while a protrusion is arranged on an outer wall of the steering column 10, in the form of snap fixing connection. Since the steering column 10 and inner ring 220 are relatively fixed, that is, the steering column 10 can swing and rotate at any angle relative to the outer ring 210, and then the steering column 10 can swing and rotate at any angle relative to the frame 30. An end of the steering column 10 passing through the frame 30 and located below the frame 30 is used to fixedly connect the wheel steering assembly 40. The wheel steering assembly 40 can operate a wheel direction, that is, the wheel steering assembly 40 can be driven to rotate by the rotation of the steering column 10, and then wheels of a vehicle are driven to steer. The other end of the steering column 10 is located above the frame 30, which is used to connect the steering control part of the vehicle, such as a steering wheel or a steering handle, to drive the steering column 10 to rotate under the operation of a driver.

A conventional vehicle steering structure generally uses a conventional bearing rotating in a single direction. A problem that an upper part and a lower part of the steering column 10 is not concentric caused by the workpiece manufacturing error, mounting error will occur, and the problem will result that components cannot be mounted smoothly and the components will be easily worn after mounting, which will affect the driving safety. This vehicle steering structure 1 provided by embodiments of the present disclosure replaces the conventional bearing rotating in a single direction by a centripetal joint bearing rotating and swinging in multiple directions, so that the steering column can swing and rotate at any angle relative to the outer ring of the centripetal joint bearing, that is, the steering column can swing and rotate at any angle relative to the frame. It can effectively compensate the problem that the fixation of an upper bearing and lower bearing of steering column is not concentric caused by the workpiece manufacturing error, mounting error so that the vehicle can be mounted smoothly. Meanwhile, non-single rotating swing angle of the bearing can avoid the wear of various components with each other, such that the heavy steering is alleviated and the driving safety is improved.

Figure 3:
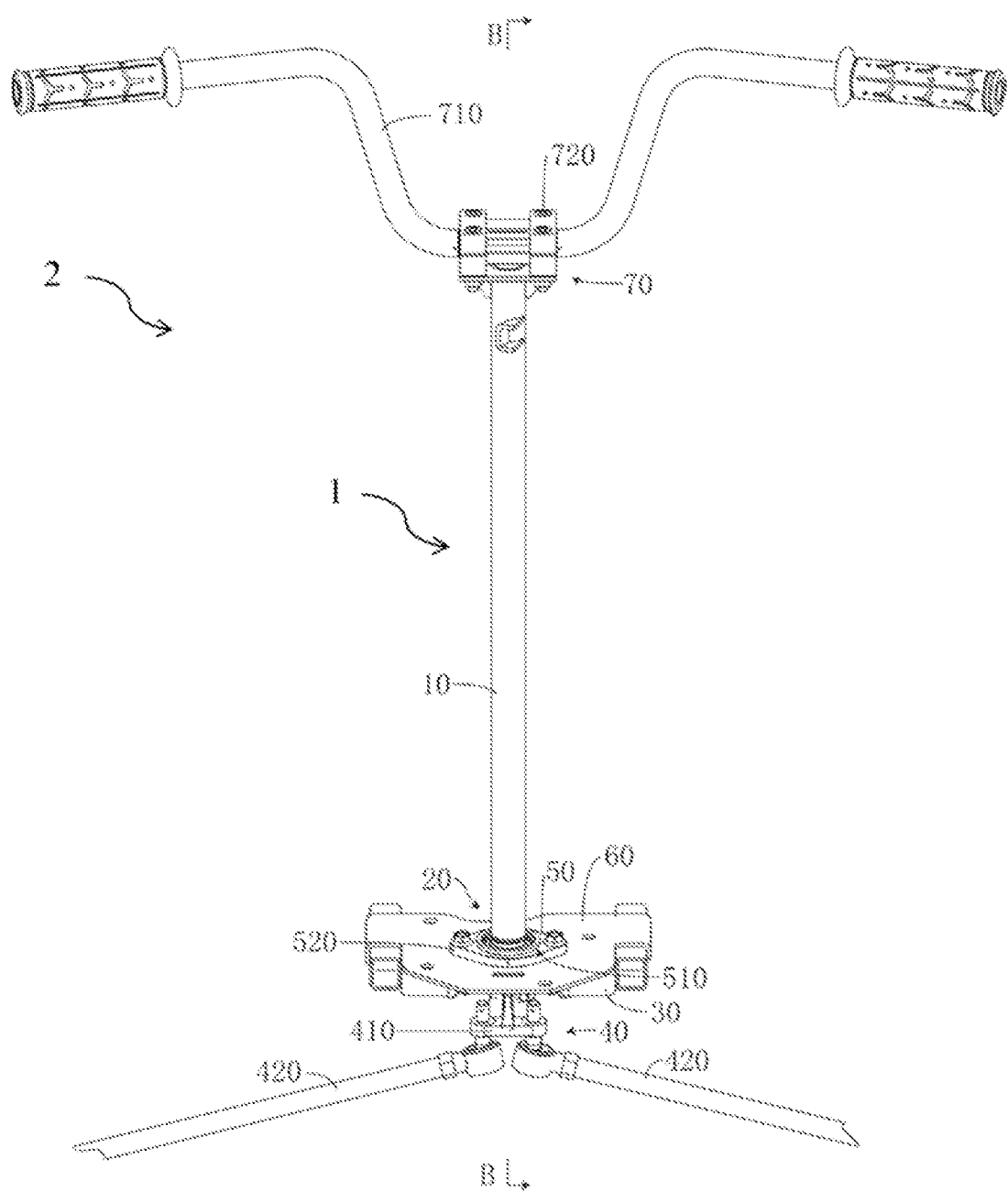
FIG. 3 is another schematic perspective view of a vehicle steering structure provided by an embodiment of the present disclosure.
Figure 4:
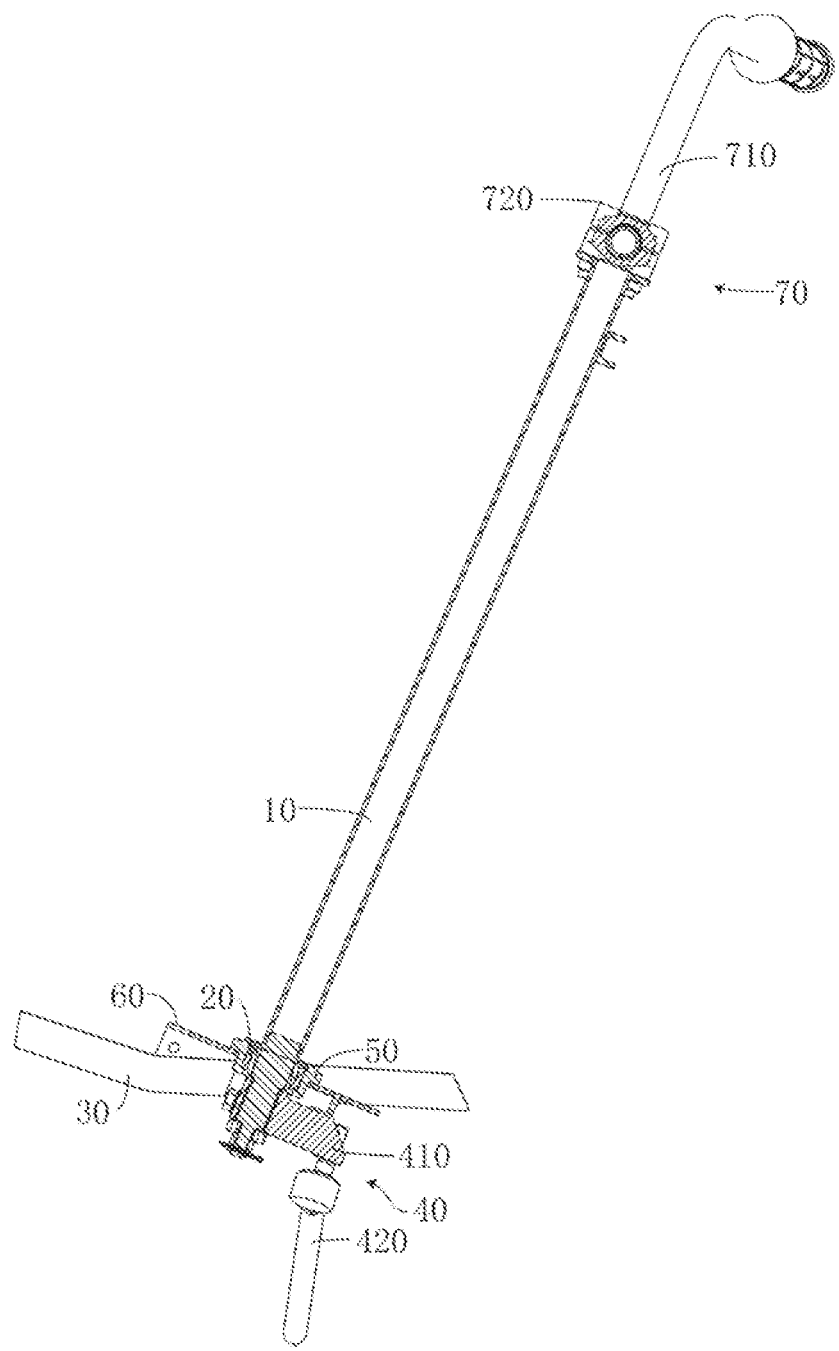
FIG. 4 is a cross-sectional view taken along B-B of FIG. 3.

Further, in combination with FIGS. 3 and 4, the vehicle steering structure 1 also includes a bearing seat 50, which is connected to the frame 30, and the outer ring 210 is located in a mounting hole 510 of the bearing seat 50.

Here, the bearing 20 is arranged in the mounting hole 510 of the bearing seat 50, an outer circumference of the bearing seat 50 is fixedly connected to the frame 30, and the outer ring 210 is fixedly connected to a hole wall of the mounting hole 510, such as in the form of a snap-fit or welding connection, to realize the embedment of the bearing 20 in the mounting hole 510.

Further, in a feasible embodiment, a mounting ear 520 is arranged on the bearing seat 50, and the mounting ear 520 is connected to the frame 30 by screws.

In at least one embodiment, each of two opposite sides of the bearing seat 50 is provided with the mounting ear 520, a through hole 5201 is defined in the mounting ear 520, and the mounting ear 520 is connected to the frame 30 by a screw passing through the through hole 5201, so that the bearing seat 50 is embedded in the frame 30, and the fixed connection of the bearing seat 50 and the frame 30 is realized.

Figure 5A:
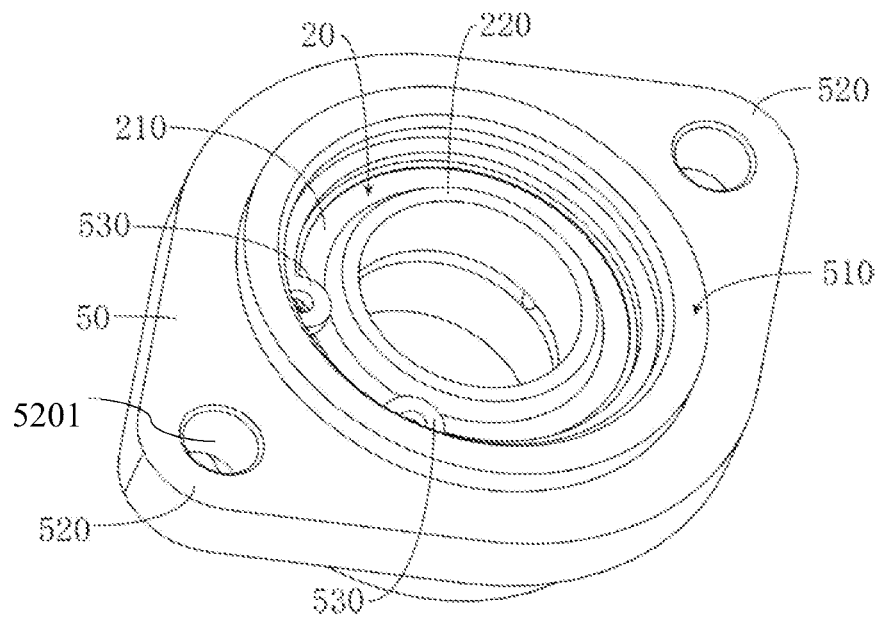
FIG. 5a is a schematic perspective view of a centripetal joint bearing and its bearing seat of a vehicle steering structure provided by an embodiment of the present disclosure.
Figure 5B:
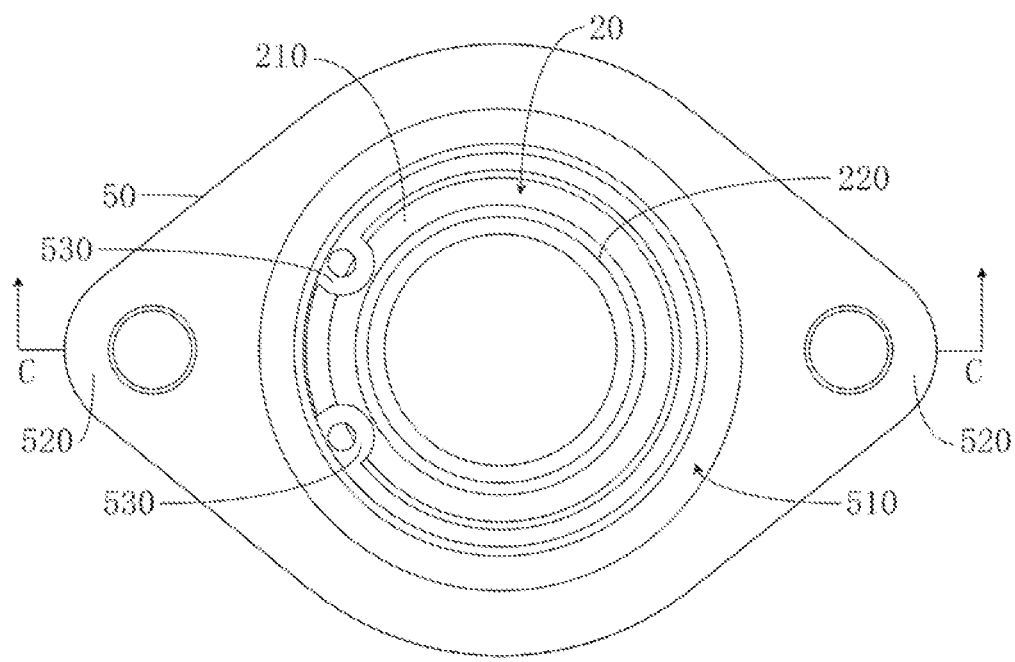
FIG. 5b is a schematic side view of a centripetal joint bearing and its bearing seat of a vehicle steering structure provided by an embodiment of the present disclosure.
Figure 5C:
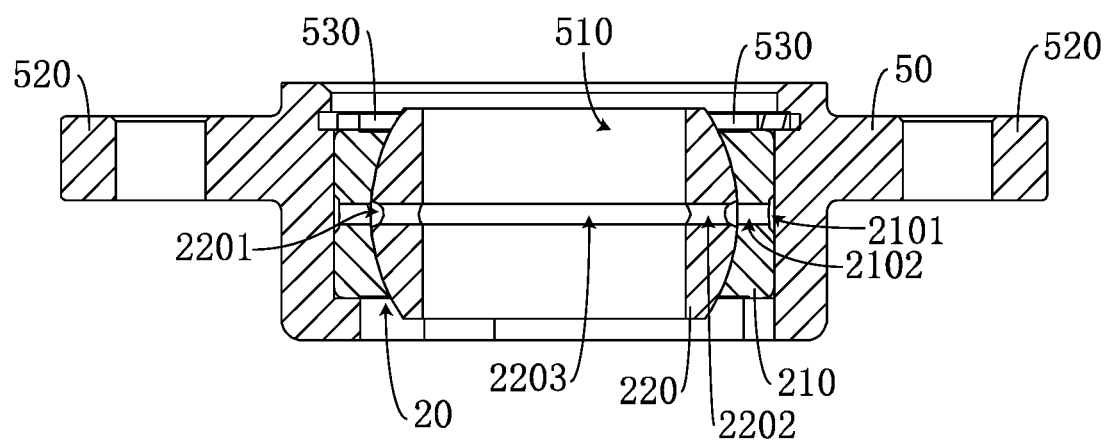
FIG. 5c is a cross-sectional view taken along C-C of FIG. 5b.
Figure 6:
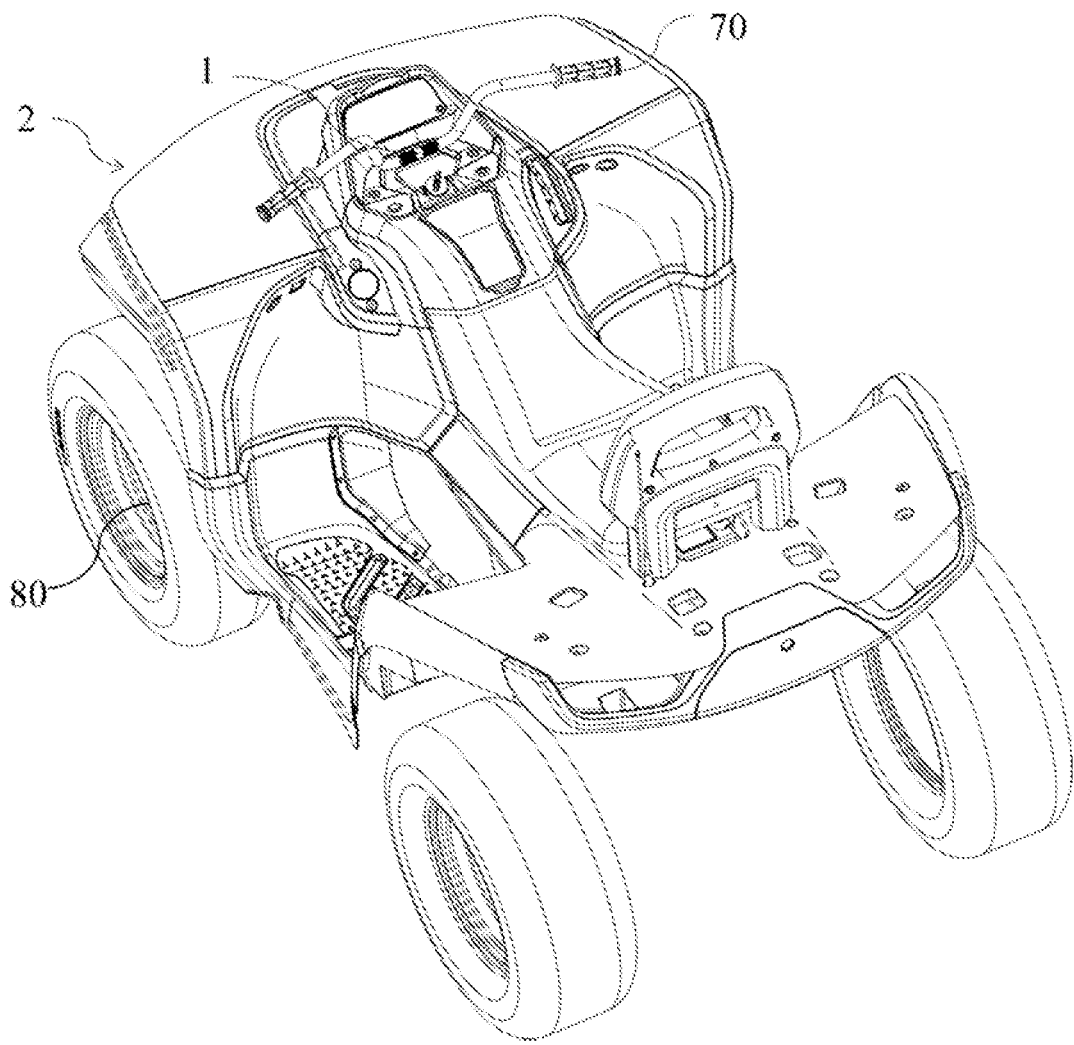
FIG. 6 is a schematic diagram of all-terrain vehicle provided by an embodiment of the present disclosure.

In addition, in combination with FIGS. 5*a*, 5*a*, and 5*c*, a retaining ring 530 is arranged in the mounting hole 510, and the retaining ring 530 is located above the outer ring 210 for preventing the bearing 20 from separating from the mounting hole 510.

In at least one embodiment, the retaining ring 530 is arranged on an inner wall of the mounting hole 510, located above the outer ring 210, and extends toward a center direction of the mounting hole 510, to block the outer ring 210 and prevent the bearing 20 from separating from the mounting hole 510. In an embodiment, the retaining ring 530 is an elastic member, that is, the bearing 20 may have a certain angle of inclination in the mounting hole 510, to be adapted to the rotation and swing in multiple directions of the steering column 10 on the frame 30.

In other embodiments of the present application, the vehicle steering structure 1 also includes a mounting seat 60, the mounting seat 60 is fixed to the frame 30, the outer ring 210 is mounted on the mounting seat 60, and the mounting seat 60 is connected to the frame 30 by screws.

In at least one embodiment, the mounting seat 60 is arranged on the frame 30, and is a mounting base plate of the bearing 20 and the bearing seat 50, the mounting seat 60 is fixedly connected to the frame 30 by screws, and the outer ring 210 of the bearing 20 is fixedly mounted on the mounting seat 60 directly or is fixedly mounted on the mounting seat 60 by the bearing seat 50.

Further, in combination with FIGS. 5*a*, 5*b*, and 5*c*, a first annular groove 2101 is defined in the outer circumference of the outer ring 210, and a first radial hole 2102 communicated to the first annular groove 2101 is defined in the outer ring 210.

In a feasible implementation, the first annular groove 2101 is defined in a middle position of the outer circumference of the outer ring 210, and the first radial hole 2102 penetrates through a thickness of the outer ring 210, and a plurality of first radial holes are defined along a circumference of the outer ring 210. In an embodiment, the first radial holes 2102 are equally spaced in the first annular groove 2101 along the circumference of the outer ring 210. The first annular groove 2101 is used for placing lubricant when using, and the lubricant flows between the inner spherical surface of the outer ring 210 and the outer spherical surface of the inner ring 220 through the first radial hole 2102, to reduce the friction force when they rotate relative to each other and improve the operational performance of the bearing 20.

Further, a second annular groove 2201 communicated with the first radial hole 2102 is defined in an outer circumference of the inner ring 220.

In a feasible implementation, the second annular groove 2201 is defined in a middle position of the outer circumference of the inner ring 220 and is corresponding to the position of the first radial hole 2102, to ensure the communication of the first annular groove 2101 and the second annular groove 2201 through the first radial hole 2102. The second annular groove 2201 between the inner spherical surface of the outer ring 210 and the outer spherical surface of the inner ring 220 is also used for placing lubricant, thereby providing a durable lubrication effect for the bearing 20 and further improving the operational performance of the bearing 20.

In addition, a second radial hole 2202 communicated with the second annular groove 2201 is defined in the inner ring 220; and a third annular groove 2203 communicated with the second radial hole 2202 is defined in an inner circumference of the inner ring 220.

In a feasible implementation, a plurality of second radial holes 2202 are arranged in a thickness direction of the inner ring 220, and the plurality of the second radial holes 2202 are spaced apart in the second annular groove 2201 along a circumference of the inner ring 220. Moreover, the third annular groove 2203 is arranged in a middle position of an inner wall of the inner ring 220, and the third annular groove 2203 is communicated with the plurality of the second radial holes 2202, so that the third annular groove 2203 is communicated with the second annular groove 2201 through the plurality of the second radial holes 2202. In use, for example, the outer ring 210 is fixedly connected to the frame 30 or the bearing seat 50 firstly, then the inner ring 220 is mounted in the outer ring 210, and then the lubricant is injected to the third annular groove 2203, and then enters into the second annular groove 2201 through the second radial hole 2202, so that the lubricant enters between the inner spherical surface of the outer ring 210 and the outer spherical surface of the inner ring 220. Thus the lubrication effect for the bearing 20 is achieved, and the operational performance of the bearing 20 is further improved.

In addition, the wheel steering assembly 40 includes a wheel steering rocker arm 410, which is located below the frame 30 and is fitted over the steering column 10.

In at least one embodiment, the wheel steering rocker arm 410 includes but is not limited to a plate-like structure, and the wheel steering rocker arm 410 is arranged below the frame 30, and is fitted over and fixedly connected to an end of the steering column 10 passing through the inner ring 220. The wheel steering rocker arm 410 is drivingly connected to a steering axle 80 of the vehicle. The wheel steering rocker arm 410 can be driven to rotate by the rotation of the steering column 10, and then the steering axle 80 of the vehicle can be driven, and a wheel is driven to rotate by the steering axle 80 of the vehicle.

Further, the wheel steering assembly 40 also includes a wheel steering rod 420, one end of the wheel steering rod 420 is connected to the wheel steering rocker arm 410, and the other end is used for connecting the steering axle 80 of the vehicle.

Here, the wheel steering rod 420 is a transmission structure between the wheel steering rocker arm 410 and the steering axle 80 of the vehicle, and two ends of the wheel steering rod 420 are respectively used to connect the wheel steering rocker arm 410 and the steering axle 80 of the vehicle.

In an embodiment of the present disclosure, one wheel steering rocker arm 410 cooperates with two wheel steering rods 420, first ends of the two wheel steering rods 420 are respectively connected to two sides of the wheel steering rocker arm 410, and second ends of the two wheel steering rods 420 are respectively used to connect two ends of the steering axle 80 of the vehicle.

In at least one embodiment, both sides of the wheel steering rocker arm 410 are each connected with the wheel steering rod 420, and the two wheel steering rods 420 are located at two sides of the steering column 10. The first ends of the two wheel steering rods 420 are respectively connected to both sides of the wheel steering rocker arm 410, and the second ends of the two wheel steering rods 420 are respectively used to connect opposite ends of the steering axle 80 of the vehicle.

In addition, embodiments of the present disclosure also provide an all-terrain vehicle 2, which includes any vehicle steering structure 1 described in the above embodiments. For the specific structure of the vehicle steering structure 1, please refer to the description of the above embodiments, and it will not be repeated here. Other structures and connection relationships of the all-terrain vehicle 2 are known to those skilled in the art, and will not be described in detail here.

In combination with FIGS. 3 and 4, the all-terrain vehicle 2 includes a steering control part 70 for driving the vehicle steering structure 1 to rotate, the steering control part 70 is arranged at an end of the steering column 10, and includes a steering handle or a steering wheel.

In at least one embodiment, the steering control part 70 is a hand-held part for a driver of the vehicle to rotate the steering column 10, and the steering control part 70 is generally arranged in a cockpit of the vehicle and is fixedly connected to an end of the steering column 10 away from the wheel steering assembly 40.

Further, in an implementation of the present embodiment, the steering control part 70 includes a steering wheel (not illustrated in figures), which is connected to the end of the steering column 10 away from the wheel steering assembly 40. That is, the steering wheel includes but is not limited to a disc shaped structure, and a center of the disc shaped structure is collinear with the central axis of the steering column 10, to drive the steering column 10 to rotate by rotating the steering wheel.

Moreover, in another implementation of the present embodiment, the steering control part 70 includes a steering handle 710 connected to the end of the steering column 10 away from the wheel steering assembly 40.

In at least one embodiment, hand-held parts are arranged on two opposite ends of the steering handle 710 for the driver of the vehicle to hold, and a middle part of the steering handle 710 is fixedly connected to the end of the steering column 10 away from the wheel steering assembly 40.

Further, the steering control part 70 also includes a pressure cover 720, and the steering handle 710 is movably connected to the end of the steering column 10 away from the wheel steering assembly 40 through the pressure cover 720. That is, the middle part of the steering handle 710 is movably connected to the end of the steering column 10 away from the wheel steering assembly 40 through the pressure cover 720. The specific movable connection mode here includes but is not limited to a screw connection, and the movable connection mode has the functions of quick assembly and disassembly and convenient maintenance.

It should be noted that although the specific implementations of the present disclosure are described in detail in combination with the accompanying drawings, it should not be understood as a limitation of the protection scope of the present disclosure. In the case of no structural conflict, the structures of the various parts mentioned in the above embodiments can be combined with each other. In order to avoid repetition, the technical solutions obtained after combination will not elaborated here, but the technical solutions obtained after combination shall also fall within the protection scope of the present disclosure. Within the scope described in the claims, various modifications and changes made by those skilled in the art without paying creative efforts still fall within the protection scope of the present disclosure.

The examples of embodiments of the present disclosure are intended to concisely illustrate technical features of embodiments of the present disclosure, so that those skilled in the art can intuitively understand the technical features of embodiments of the present disclosure, and are not used as an improper limitation of embodiments of the present disclosure.

The embodiments of devices described above are only schematic, in which the units described as separate components may or may not be physically separated, and the components displayed as units may or may not be physical units, that is, they may be located in one place or distributed to a plurality of network units. A part or all of the modules can be selected according to the actual needs to realize the purpose of the solution of the embodiment. Those skilled in the art can understand and implement the solution without paying creative efforts.

The above description shows and describes several preferred embodiments of the embodiments of the present disclosure. However, as mentioned above, it should be understood that embodiments of the present disclosure are not limited to the form disclosed herein, and should not be regarded as the exclusion of other embodiments, while embodiments of the present disclosure can be used in various other combinations, modifications and environments, and can be changed through the above teachings or technologies or knowledge in the related field within the scope of the concept of the present disclosure described herein. The modifications and changes made by those in the art without departing from the spirit and scope of embodiments of the present disclosure should fall within the protection scope of the claims attached to embodiments of the present disclosure.

What is claimed is:

1. A vehicle steering structure, comprising:
a frame;
a wheel steering assembly;
a bearing comprising an outer ring with an inner spherical surface and an inner ring with an outer spherical surface, the inner ring being arranged in the outer ring, an outer circumference of the outer ring being connected to the frame; and
a steering column passing through the inner ring, and having a first end configured to connect a steering control part and a second end connected to the wheel steering assembly,
wherein the outer circumference of the outer ring defines a first annular groove, and the outer ring defines a first radial hole communicated with the first annular groove.

2. The vehicle steering structure according to claim 1, wherein the inner spherical surface and the outer spherical surface are in contact with each other.

3. The vehicle steering structure according to claim 1, further comprising a bearing seat connected to the frame and defining a mounting hole, the outer ring being located in the mounting hole of the bearing seat.

4. The vehicle steering structure according to claim 3, wherein the mounting hole is provided with a retaining ring therein, and the retaining ring is located above the outer ring.

5. The vehicle steering structure according to claim 4, wherein the retaining ring is an elastic member.

6. The vehicle steering structure according to claim 1, further comprising a mounting seat fixed to the frame, the outer ring being mounted on the mounting seat, the mounting seat being connected to the frame by a screw.

7. The vehicle steering structure according to claim 3, wherein the bearing seat is provided with a mounting ear, and the mounting ear is connected to the frame by a screw.

8. The vehicle steering structure according to claim 7, wherein each of two opposite sides of the bearing seat is provided with the mounting ear, and each the mounting ear defines a through hole and is connected to the frame by a screw passing through the through hole.

9. The vehicle steering structure according to claim 1, wherein the first annular groove is defined in a middle position of the outer circumference of the outer ring, and the first radial hole penetrates through a thickness of the outer ring, and a plurality of first radial holes are defined along a circumference of the outer ring.

10. The vehicle steering structure according to claim 9, wherein the first radial holes are equally spaced in the first annular groove along the circumference of the outer ring.

11. The vehicle steering structure according to claim 1, wherein an outer circumference of the inner ring defines a second annular groove communicated with the first radial hole.

12. The vehicle steering structure according to claim 11, wherein the second annular groove is defined in a middle position of the outer circumference of the inner ring and is corresponding to a position of the first radial hole.

13. The vehicle steering structure according to claim 11, wherein the inner ring defines a second radial hole communicated with the second annular groove.

14. The vehicle steering structure according to claim 13, wherein a plurality of second radial holes are arranged in a thickness direction of the inner ring, and the plurality of the second radial holes are spaced apart in the second annular groove along a circumference of the inner ring.

15. The vehicle steering structure according to claim 13, wherein an inner circumference of the inner ring defines a third annular groove communicated with the second radial hole.

16. The vehicle steering structure according to claim 1, wherein the wheel steering assembly comprises a wheel steering rocker arm, and the wheel steering rocker arm is located below the frame and is fitted over the steering column.

17. The vehicle steering structure according to claim 16, wherein the wheel steering assembly further comprises a wheel steering rod having a first end connected to the wheel steering rocker arm and a second end configured to connect a steering axle.

18. An all-terrain vehicle, comprising:
   a steering control part; and
   a vehicle steering structure comprising:
      a frame;
      a wheel steering assembly;
      a bearing comprising an outer ring with an inner spherical surface and an inner ring with an outer spherical surface, the inner ring being arranged in the outer ring, an outer circumference of the outer ring being connected to the frame; and
      a steering column passing through the inner ring, and having a first end connected to the steering control part and a second end connected to the wheel steering assembly,
      wherein the outer circumference of the outer ring defines a first annular groove, and the outer ring defines a first radial hole communicated with the first annular groove.

19. The all-terrain vehicle according to claim 18, wherein the steering control part comprises a steering handle and a pressure cover, and the steering handle is movably connected to an end of the steering column away from the wheel steering assembly through the pressure cover.

* * * * *